US012812507B2

(12) United States Patent
Li

(10) Patent No.: US 12,812,507 B2
(45) Date of Patent: Nov. 24, 2026

(54) ACCESS CONTROL METHOD AND COMMUNICATION DEVICE, AND STORAGE MEDIUM

(71) Applicant: Beijing Xiaomi Mobile Software Co., Ltd., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 746 days.

(21) Appl. No.: 18/012,502

(22) PCT Filed: Jul. 3, 2020

(86) PCT No.: PCT/CN2020/100286
§ 371 (c)(1),
(2) Date: Dec. 22, 2022

(87) PCT Pub. No.: WO2022/000514
PCT Pub. Date: Jan. 6, 2022

(65) Prior Publication Data

US 2023/0254758 A1 Aug. 10, 2023

(51) Int. Cl.
*H04W 48/02* (2009.01)
*H04W 76/30* (2018.01)

(52) U.S. Cl.
CPC ........... *H04W 48/02* (2013.01); *H04W 76/30* (2018.02)

(58) Field of Classification Search
CPC ..... H04W 48/02; H04W 76/30; H04W 76/18; H04W 48/08; H04W 48/16
See application file for complete search history.

(56) References Cited

U.S. PATENT DOCUMENTS

2010/0297979 A1* 11/2010 Watfa .................... H04W 8/205 455/404.1
2012/0002545 A1* 1/2012 Watfa .................... H04W 48/06 370/328
2012/0250626 A1* 10/2012 Iwamura .............. H04W 76/18 370/328
2016/0007239 A1* 1/2016 Manepalli ............ H04W 76/27 370/331
2018/0263562 A1* 9/2018 Laplante-Lévesque .................... A61B 5/686

(Continued)

FOREIGN PATENT DOCUMENTS

CN 103857008 A 6/2014
CN 109314902 A 2/2019

(Continued)

OTHER PUBLICATIONS

3GPP TSG SA WG1: "Reply LS on RRCReject T302 Timer Exemption for MPS and MCS", 3GPP TSG-SA WG1 Meeting #85 S1-190112, Feb. 22, 2019 (Feb. 22, 2019), XP051609393. 1 page.

(Continued)

*Primary Examiner* — Mazda Sabouri
(74) *Attorney, Agent, or Firm* — Volpe Koenig

(57) ABSTRACT

An access control method, performed by a user equipment. The method includes: starting a prohibit timer in response to a call being rejected in the user equipment; and determining, according to a service type of the call triggering the starting of the prohibit timer, an operation for a first service type of call during the running of the prohibit timer.

17 Claims, 6 Drawing Sheets

(56) References Cited

U.S. PATENT DOCUMENTS

| | | | |
|---|---|---|---|
| 2019/0141609 | A1 | 5/2019 | Kim et al. |
| 2019/0268827 | A1 | 8/2019 | Kim et al. |

FOREIGN PATENT DOCUMENTS

| | | | |
|---|---|---|---|
| CN | 109565742 | A | 4/2019 |
| WO | 2019216809 | A | 11/2019 |

OTHER PUBLICATIONS

Vivo: "Remaining issue on T302 handling", 3GPP TSG-RAN WG2 Meeting #103 R2-1811770, Aug. 24, 2018 (Aug. 24, 2018), XP051521409. 3 pages.

* cited by examiner

ACCESS CONTROL METHOD AND COMMUNICATION DEVICE, AND STORAGE MEDIUM

CROSS REFERENCE TO RELATED APPLICATION

The present application is a U.S. National Stage of International Application No. PCT/CN2020/100286, filed on Jul. 3, 2020, the contents of all of which are incorporated herein by reference in their entirety for all purposes.

BACKGROUND

In the related art, a timer for radio resource control (RRC) connection rejection is set according to a connection control mode of a new radio (NR) in a 5th generation mobile communication (5G) system. On the one hand, when the timer is running, a user equipment can no longer initiate services. On the other hand, when the timer is running, the user equipment may respond to a paging message transmitted by a radio access network (RAN) or a core network (CN). At the same time, an emergency call cannot be limited by the timer. Once the user equipment responds to RAN paging, CN paging, or the emergency call, the timer needs to be stopped; that is, prohibited services will be subject to prohibition mitigation.

SUMMARY

According to a first aspect of the disclosure, an access control method is provided, performed by a user equipment, and includes: starting a prohibit timer in response to a call being rejected in the user equipment; and determining, according to a service type of the call triggering the start of the prohibit timer, an operation for a first service type of call during running of the prohibit timer.

According to a second aspect of the disclosure, a communication device is provided that includes a processor and a memory configured to store processor-executable instructions. The processor is configured to perform the method according to the first aspect when executing the processor-executable instructions.

According to a third aspect of the disclosure, a non-transitory computer storage medium is provided that stores computer-executable programs, and the computer-executable programs perform the method according to the first aspect when executed by a processor.

DETAILED DESCRIPTION

Examples will be described in detail here, and instances are shown in the accompanying drawings. When the following description refers to the accompanying drawings, unless otherwise indicated, the same numbers in different accompanying drawings indicate the same or similar elements. The implementations described in the following examples do not represent all implementations consistent with the examples of the disclosure. Rather, they are merely instances of apparatuses and methods consistent with some aspects of the examples of the disclosure as detailed in the appended claims.

The terms used in the examples of the disclosure are merely for the purpose of describing specific examples, and are not intended to limit the examples of the disclosure. The singular forms "one" and "the" used in the examples of the disclosure and the appended claims are also intended to include the plural forms unless the context clearly indicates other meanings. It also needs to be understood that the term "and/or" as used here refers to and includes any or all possible combinations of one or more associated listed items.

It needs to be understood that although the terms first, second, third, etc. may be used to describe various information in the examples of the disclosure, such information should not be limited to these terms. These terms are merely used to distinguish the same type of information from each other. For instance, without departing from the scope of the examples of the disclosure, first information may also be referred to as second information, and similarly, the second information may also be referred to as the first information. Depending on the context, the word "if" as used here can be interpreted as "at the time . . . ", "when . . . ", or "in response to determining".

For the purpose of brevity and easy understanding, the terms used in this paper when representing a size relationship are "greater than" or "smaller than". However, for those skilled in the art, it can be understood that the term "greater than" also covers the meaning of "greater than or equal to", and "smaller than" also covers the meaning of "smaller than or equal to".

The disclosure relates to the technical field of wireless communication, but is not limited to this. In particular, the disclosure relates to an access control method, a communication device, and a storage medium.

With the introduction of artificial intelligence (AI) mobile applications, the demand for services for network-side resources is no longer limited to radio resources. The above connection control mode for the radio resources can no longer meet the demand of new services after the introduction of the AI mobile applications.

Figure 1:
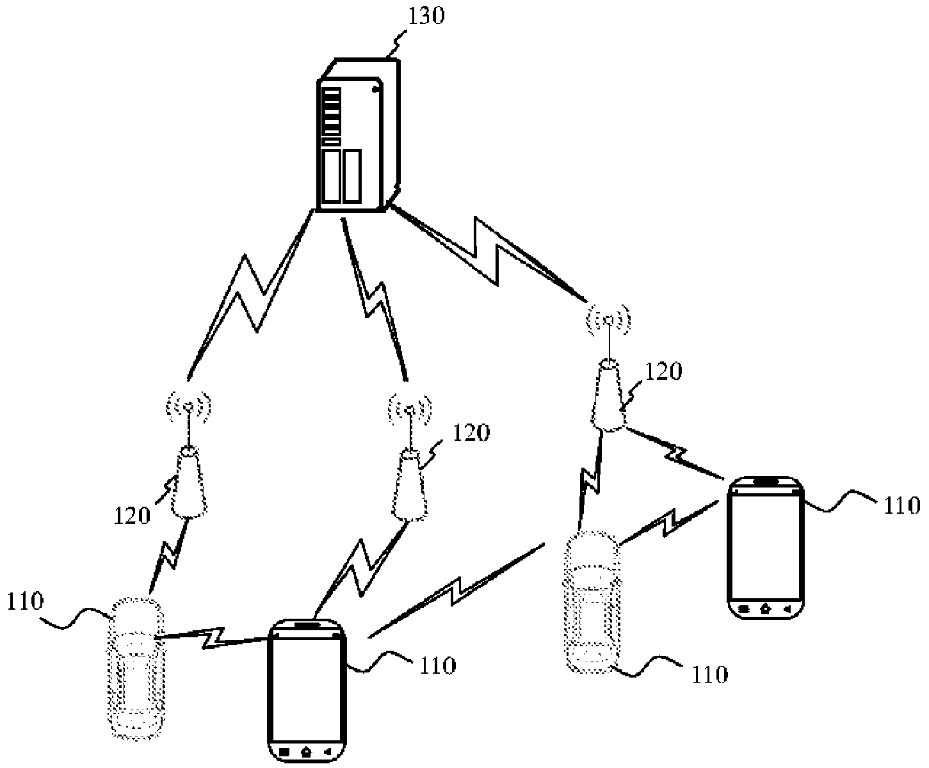
FIG. 1 is a schematic structural diagram of a wireless communication system.

FIG. 1 illustrates a schematic structural diagram of a wireless communication system provided by an example of the disclosure. As shown in FIG. 1, the wireless communication system is a communication system based on a cellular mobile communication technology. The wireless communication system may include a plurality of user equipment 110 and a plurality of base stations 120.

The user equipment 110 may refer to a device that provides a user with voice and/or data connectivity. The user equipment 110 may communicate with one or more core networks via a radio access network (RAN). The user equipment 110 may be an Internet of Things (IoT) user device, such as a sensor device, a mobile phone (or called "cellular" phone), or a computer with an IoT user device. For instance, the user equipment 110 may be fixed, portable, pocket-sized, handheld, computer-built-in, or vehicle-mounted apparatuses. For instance, it may be a station (STA), a subscriber unit, a subscriber station, a mobile station, a mobile, a remote station, an access point, a remote terminal, an access terminal, a user terminal, a user agent, a user device, or user equipment. The terminals 110 may also be devices of Industry Internet of Things (IIOT), such as a forklift and an automatic assembly device. The user equipment 110 may also be unmanned aircraft devices. The user equipment 110 may also be vehicle-mounted devices, such as a trip computer with a wireless communication function, or a wireless user device externally connected to a trip computer. The user equipment 110 may also be infrastructure, such as a street lamp, a signal light, or other infrastructure with a wireless communication function.

The base stations 120 may be network-side devices in the wireless communication system. The wireless communication system may be the 4th generation mobile communication (4G) system, also known as a long-term evolution (LTE) system; or the wireless communication system may also be a 5G system, also known as a new radio system or a 5G NR system. The wireless communication system may also be a next-generation system of the 5G system. An access network in the 5G system may be called a new generation radio access network (NG-RAN).

The base stations 120 may be evolved base stations (eNBs) adopted in the 4G system. The base stations 120 may also be base stations (gNBs) adopting centralized and distributed architectures in the 5G system. When the base stations 120 adopt the centralized and distributed architectures, each typically includes a central unit (CU) and at least two distributed units (DUs). Protocol stacks of a packet data convergence protocol (PDCP) layer, a radio link control (RLC) layer and a media access control (MAC) layer are disposed in the central unit; and protocol stacks of physical (PHY) layers are disposed in the distributed units, and specific implementations of the base stations 120 are not limited to the example of the disclosure.

The base stations 120 and the user equipment 110 may establish a wireless connection through a wireless radio. In different implementations, the wireless radio is a wireless radio based on the 4G standard; or, the wireless radio is a wireless radio based on the 5G standard, such as a new radio; or, the wireless radio may also be a wireless radio based on the next-generation mobile communication standard of 5G.

In some examples, the user equipment 110 may also establish an end-to-end (E2E) connection, for instance, vehicle-to-vehicle (V2V) communication, vehicle-to-infrastructure (V2I) communication, vehicle-to-pedestrian (V2P) communication in vehicle-to-everything (V2X) communication, and other scenarios.

Here, the above user equipment 110 may be considered as a terminal device of the following examples.

In some examples, the wireless communication system described above may further include a network management device 130.

The plurality of base stations 120 is connected to the network management device 130. The network management device 130 may be a core network device in the wireless communication system. For instance, the network management device 130 may be a mobility management entity (MME) in an evolved packet core (EPC). The network management device may also be other core network devices, such as a serving gateway (SGW), a public data network gateway (PGW), a policy and charging rules function (PCRF), or a home subscriber server (HSS). Further, the network management device 130 may be a location management function entity. The implementation form of the network management device 130 is not limited to the examples of the disclosure.

In order to facilitate the understanding of any example of the disclosure, firstly, a T302 timer is taken as an instance to describe an access control method through an example.

The T302 timer is configured to control the time of a process from a network-side device (such as a base station 120), rejecting radio resource control (RRC) connection setup of the user equipment 110 to initiation of the next radio resource control (RRC) connection setup by the user equipment. After receiving a radio resource control (RRC) connection reject message, the user equipment obtains a wait time carried in the message, and a value of the running time of the T302 timer is determined by the wait time. After the T302 timer is started, only some specific types of calls can be performed, and other types of calls are prohibited. Here, the specific types of calls may be emergency calls initiated by a terminal.

In one example, the user equipment 110 initiates a call to a network for a conventional service that merely needs radio resources. For instance, a phone call is made. Here, the radio resources may be time-frequency domain resources for wireless communication. After the call for the conventional service is rejected by the network, the network transmits the radio resource control (RRC) connection reject message to the user equipment 110. The T302 timer is started for timing, and when the timer is running, it will prevent initiation of the conventional service until the timer expires. When the timer is running, if there is RAN paging, CN paging, or an emergency call, the T302 timer needs to be stopped or reset. In this way, the timer stops preventing the initiation of the conventional service, and the user equipment 110 may continue to initiate the conventional service.

In one example, the services introduce artificial intelligence (AI) mobile applications, and the implementation of the AI mobile applications requires a lot of computing resources. Here, the computing resources may be computing capability resources, central processing unit (CPU) resources, storage resources, power, and the like. Here, the computing capability resources may be an algorithm model. After a new service call (such as a service containing the AI mobile applications) initiated by the user equipment is rejected due to insufficient computing resources, the T302 timers may be started. After the T302 timer is started, when the T302 timer is running, if all services (including the conventional services and new services) are prevented, the utilization rate of the radio resources will be very low, which is not appropriate. Because the computing resources are insufficient, there are still radio resources needed by the conventional service. When the T302 timer is running, if there is RAN paging, CN paging, or an emergency call, and the T302 timer is stopped or reset, the user equipment may initiate a new service (such as a service containing the AI mobile applications) again, which is also not appropriate. Because the new service needs to consume a lot of computing resources, and the network side will still be insufficient, unnecessary calls may be caused.

Figure 2:
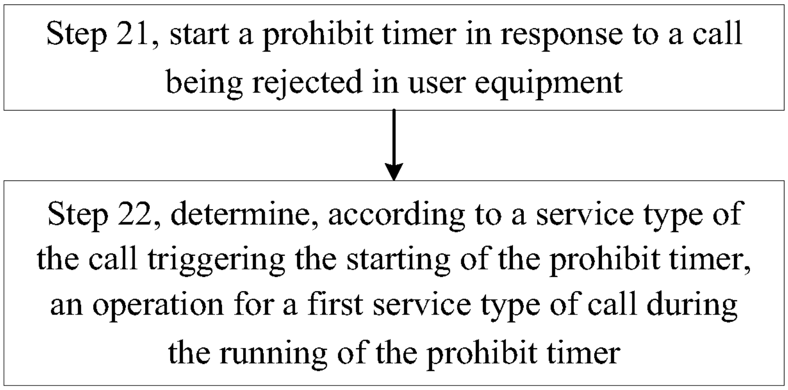
FIG. 2 is a flowchart of an access control method illustrated according to an example.

As shown in FIG. 2, the example provides an access control method performed by the user equipment and includes steps 21 and 22.

In step 21, in response to a call being rejected in the user equipment, a prohibit timer is started.

In step 22, according to a service type of the call triggering the start of the prohibit timer, an operation for a first service type of call during the running of the prohibit timer is determined.

The user equipment may be, but is not limited to, at least one of a mobile phone, a wearable device, a vehicle-mounted terminal, a roadside unit (RSU), a smart home terminal, a device of the Internet of Things, a device of the Industrial Internet of Things, a sensing device, or a medical device.

In one example, the user equipment 110 may initiate a service call to a network-side device 120. The network-side device may be a base station. The base station may be an interface device of a terminal access network. The base station may be various types of base stations, such as a base station of a 3rd generation mobile communication (3G) network, a base station of a 4th generation mobile communication (4G) network, a base station of a 5th generation mobile communication (5G) network, or other evolution base stations.

In one example, the user equipment may determine that the call is rejected when receiving the radio resource control (RRC) connection reject message transmitted by the network-side device.

In one example, the user equipment initiates a call for service A to the network-side device and requests to set up a radio resource control (RRC) connection. However, due to the limited resources of the network-side device, which cannot meet the large amount of computing resources and storage resources needed by the service A, the network-side device may reject the call initiated for the service A by the user equipment, and transmit the radio resource control (RRC) connection reject message to the user equipment.

In one example, a prohibit timer is configured to control the time of a process from a network-side device, rejecting radio resource control (RRC) connection setup of the user equipment to initiation of the next radio resource control (RRC) connection setup by the user equipment. Here, the running time of the prohibit timer may be a wait time carried in the radio resource control (RRC) connection reject message initiated by the network-side device. Here, when the prohibit timer is running, the user equipment may be prohibited from initiating service calls. For instance, the user equipment may be prohibited from initiating a service call containing artificial intelligence (AI) mobile applications. In this way, the user equipment may reduce the frequency of repeated calls after the call is rejected. Here, the prohibit timer may be, but is not limited to, the T302 timer.

In one example, in response to the user equipment receiving the radio resource control (RRC) connection reject message transmitted by the network-side device, the prohibit timer may be started. Here, starting the prohibit timer may be starting the prohibit timer for timing. Here, a duration of timing may be the wait time carried in the radio resource control (RRC) connection reject message. Here, when the prohibit timer expires, the user equipment may be allowed to initiate various service calls.

In one example, a first service type of call may be a service type of call that needs the radio resources but does not need the computing resources, for instance, a voice service type of call, a video service type of call, a location service type of call, and the like. Here, the first service type of call may be a call that the user equipment attempts to initiate in response to the first service type of call, or a call from the network-side device that attempts to set up the radio resource control (RRC) connection, which may also be called a radio resource control connection message, for instance, a radio resource control connection message in response to radio access network (RAN) paging, core network (CN) paging, an emergency call or the like. The user equipment may operate for the first service type of call, for instance, it initiates a call based on the service demand of the first service type, or responds to the radio resource control connection message from the network-side device (for instance, transmits a response message for the radio resource control connection message to the network side).

In one example, the service whose call is rejected in the user equipment may be a service of the first service type. For instance, the service of the first service type is a high-quality video communication service. The user equipment initiates the high-quality video communication service, but the radio resources of the network side for high-quality video communication are insufficient, and the call is rejected. Here, the radio resources may be time-frequency domain resources. Here, the radio resources being insufficient may refer to the time-frequency domain resources being insufficient. For instance, a high-quality video service needs a bandwidth of 300 M/s; however, the network side can merely provide a bandwidth of 200 M/s, and at this time, the bandwidth is insufficient.

In one example, the service whose call is rejected in the user equipment may further be a service of a second service type.

In one example, the service of the first service type may be a service that needs a large amount of radio resources and a small amount of computing resources; for instance, a voice service that needs frequency domain resources greater than a Mbps and central processing unit (CPU) resources smaller than b Mbps. The second service type may be a service that needs a large amount of computing resources and a small amount of radio resources. For instance, a smart driving service that requires frequency domain resources smaller than c Mbps and central processing unit (CPU) resources greater than d Mbps. Here, $a>c$; and $b<d$. In one example, the network side can usually meet the computing resources of the service of the first service type and the radio resources of the service of the second service type.

Here, the service of the second service type is a service that needs a large amount of computing resources. For instance, a data analysis service and a high-precision image processing service that need a large amount of computing resources.

In one example, the user equipment initiates a call for a massive data analysis service. However, the computing resources of the network side for the massive data analysis service are insufficient, and the call is rejected. Here, the computing resources may be computing capability resources, central processing unit (CPU) resources, storage resources, power, and the like. Here, the computing resources being insufficient may refer to the computing central processing unit (CPU) resources and the storage resources being insufficient. For instance, massive data analysis needs 80% of central processing unit (CPU) resources and 50% of storage resources, however, the network side can merely provide 30% of central processing unit resources and 20% of storage resources, and at this time, the situation that the central processing unit (CPU) resources and the storage resources are insufficient may occur.

In one example, a running period of the prohibit timer may be a time period from the start to the end of the prohibit timer.

In one example, the service type may be a first service type or a second service type, for instance, the first service type that needs a large amount of radio resources and a small amount of computing resources, and the second service type that needs a large amount of computing resources and a small amount of radio resources. Here, it needs to be noted that the network side can usually meet the computing resources of the service of the first service type or the radio resources of the service of the second service type.

In one example, the user equipment initiates a call to the network-side device for a biological sample training service. Since the biological sample training service needs to consume a large amount of computing resources, and the network-side device cannot meet it, the network-side device transmits a radio resource control (RRC) connection reject message carrying a wait time to the user equipment. In response to receiving the radio resource control (RRC) connection reject message, the user equipment starts the prohibit timer, and sets the wait time as a running duration of the prohibit timer.

When the prohibit timer is running, the user equipment needs to initiate a service call of a voice call, since the voice call needs to occupy more radio resources rather than computing resources; at this time, the voice call service may be allowed to initiate a call. In this way, the situation that after the prohibit timer is started by the service of the second service type, the service of the first service type cannot initiate a call may be reduced. In this way, utilization of the resources of the service of the first service type is more flexible, and the utilization efficiency of the resources of the service of the first service type is improved. In one example, when the prohibit timer is running, the user equipment needs to initiate a smart driving service (the service of the second service type). Since the smart driving service also needs to occupy more computing resources, at this time, the smart driving service may be prohibited from initiating a call. In this way, in a case where the service resources are insufficient, frequent service calls are reduced.

In one example, the user equipment initiates a call to the network-side device for a video communication service. Since the video communication service needs to consume a large amount of radio resources, and the network-side device cannot meet it, the network-side device transmits a radio resource control (RRC) connection reject message carrying a wait time to the user equipment. In response to receiving the radio resource control (RRC) connection reject message, the user equipment starts the prohibit timer, and sets the wait time as a running duration of the prohibit timer. When the prohibit timer is running, the user equipment needs to initiate a service call of a voice call, since the voice call needs to occupy a large amount of radio resources; at this time, the voice call service is prohibited from initiating a call. In this way, in a case where the service resources of the first service type are insufficient, unnecessary calls for the service resources of the first service type are reduced. In one example, when the prohibit timer is running, the user equipment needs to initiate a call for a massive data analysis service, since the massive data analysis service also needs to occupy a large amount of radio resources; at this time, the massive data analysis service may be prohibited from initiating a call. In this way, in a case where the service resources are insufficient, frequent service calls are reduced.

In the example, during the running of the prohibit timer, the operation for the first service type of call is not necessarily prohibited, but whether the operation for the first service type of call is allowed may be determined according to the service type of the call triggering the start of the prohibit timer. Compared with the mode that the operation for the first service type of call will be necessarily prohibited during the running of the prohibit timer, there is still an opportunity to initiate the first service type of call or respond to the first service type of call, so as to obtain network resources of services. In this way, the operation for the first service type of call is more flexible, and the utilization rate of the network resources is improved.

Figure 3:
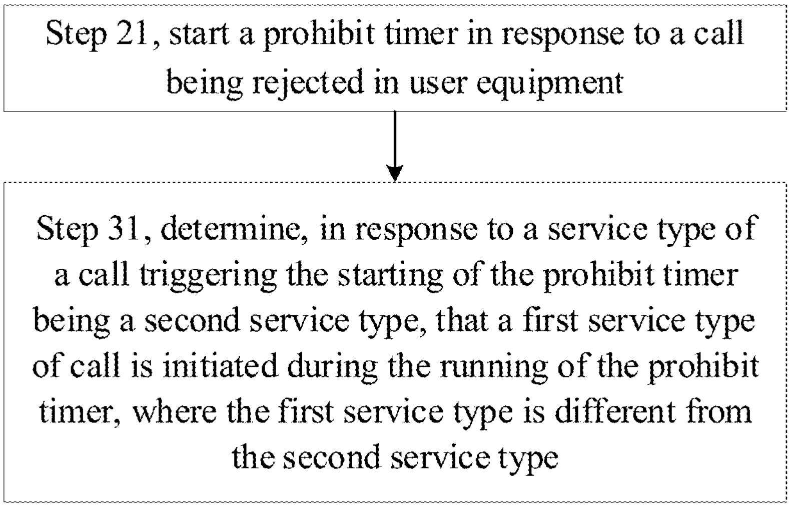
FIG. 3 is a flowchart of an access control method illustrated according to an example.

As shown in FIG. 3, the example provides an access control method which further explains step 22, determining, according to the service type of the call triggering the start of the prohibit timer, the operation for the first service type of call during the running of the prohibit timer.

In step 31, in response to the service type of the call triggering the start of the prohibit timer being a second service type, it is determined that the first service type of call is initiated during the running of the prohibit timer, where the first service type is different from the second service type.

In one example, determining the operation for the first service type of call during the running of the prohibit timer may be that a call for the first service type is allowed to be initiated during the running of the prohibit timer. Here, the call for the first service type being allowed to be initiated during the running of the prohibit timer may be the user equipment being allowed to initiate a flow of setting up radio resource control (RRC) with a base station for a service of the first service type.

In one example, the service of the second service type is a service that needs a large amount of computing resources, for instance, a data analysis service, a smart driving service, a remote medical service, and a high-precision image processing service that need a large amount of computing resources. A call initiated for the service of the second service type may be a call initiated for the data analysis service or a call initiated for the high-precision image processing service.

In one example, in response to the call initiated by the service of the second service type being rejected by the network side, the user equipment triggers the start of the prohibit timer. Here, a call for the remote medical service initiated by the user equipment may be rejected by the network side. Since the remote medical service needs to consume a large amount of computing resources, and the network-side device cannot meet it, the network-side device transmits a radio resource control (RRC) connection reject message carrying a wait time to the user equipment. In response to receiving the radio resource control (RRC) connection reject message, the user equipment triggers the start of the prohibit timer, and sets the wait time as a running duration of the prohibit timer. When the prohibit timer is running, the user equipment needs to initiate a service call of a voice call, since the voice call needs to occupy more radio resources rather than corresponding computing resources when the call initiated by the remote medical service is rejected, the network side may provide for the voice call service, and at this time, the voice call service may be allowed to initiate a call. In this way, the situation that after the prohibit timer is started by the service of the second service type, the service of the first service type cannot initiate a call may be reduced. In this way, utilization of the resources of the service of the first service type is more flexible, and the utilization efficiency of the resources of the service of the first service type is improved.

Figure 4:
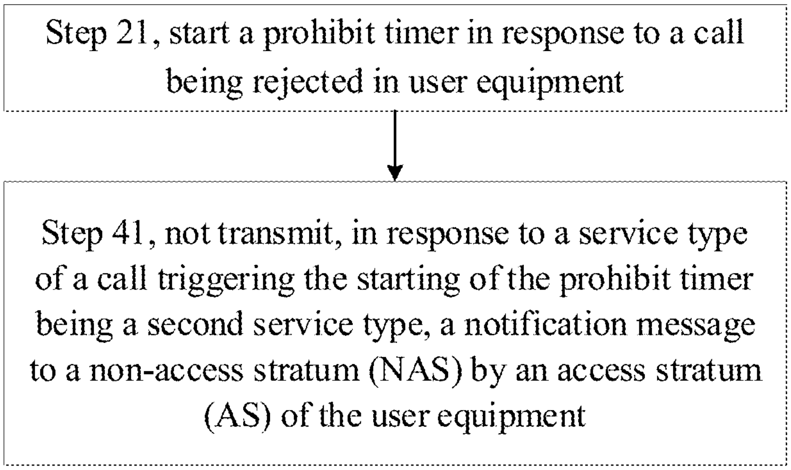
FIG. 4 is a flowchart of an access control method illustrated according to an example.

As shown in FIG. 4, the example provides an access control method, which further explains step 31, determining, in response to the service type of the call triggering the start of the prohibit timer being the second service type, that the first service type of call is initiated during the running of the prohibit timer.

In step 41, in response to the service type of the call triggering the start of the prohibit timer being the second service type, a notification message is not transmitted to a non-access stratum (NAS) by an access stratum (AS) of the user equipment.

In one example, a call initiated by the user equipment in response to the high-precision image processing service may be rejected by the network side. Here, the service type of the high-precision image processing service is the second service type. Since the high-precision image processing service needs to consume a large amount of computing resources, and the network-side device cannot meet it, the network-side device transmits a radio resource control (RRC) connection reject message carrying a wait time to the user equipment. In response to receiving the radio resource control (RRC) connection reject message, the user equipment triggers the start of the prohibit timer, and sets the wait time as a running duration of the prohibit timer. At this time, the notification message is not transmitted to the non-access stratum (NAS) by the access stratum (AS) of the user equipment. In this way, the first service type of call cannot be prevented.

Figure 5:
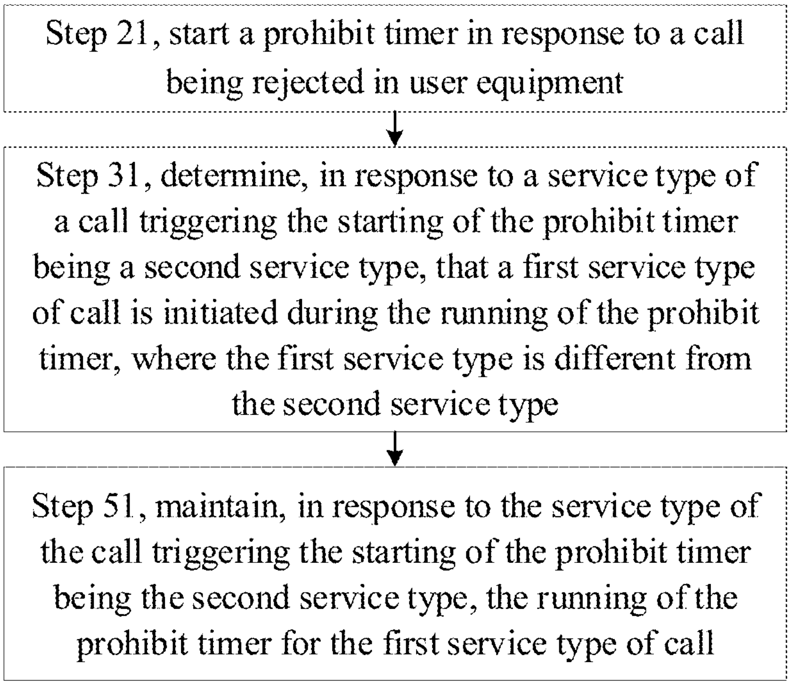
FIG. 5 is a flowchart of an access control method illustrated according to an example.

As shown in FIG. 5, the example provides an access control method including steps 21 and 31, further includes step 51.

In step 51, in response to the service type of the call triggering the start of the prohibit timer being the second service type, the running of the prohibit timer is maintained for the first service type of call.

In one example, maintaining the running of the prohibit timer for the first service type of call may be that when a call is initiated for the service of the first service type, then the timing of the prohibit timer is not stopped.

In one example, in response to the call initiated by the service of the second service type being rejected by the network side, the user equipment triggers the start of the prohibit timer. Here, a call initiated by the user equipment in response to an unmanned aerial vehicle control service may be rejected by the network side. Since the unmanned aerial vehicle control service needs to consume a large amount of computing resources, and the network-side device cannot meet it, the network-side device transmits a radio resource control (RRC) connection reject message carrying a wait time to the user equipment. In response to receiving the radio resource control (RRC) connection reject message, the user equipment triggers the start of the prohibit timer, and sets the wait time as a running duration of the prohibit timer. Here, the running duration is 20 s. If a call for the service of the first service type is initiated when the prohibit timer is timed to 10 s, at this time, the timing of the prohibit timer will not be stopped, but will continue according to the set running duration of 20 s until the timing of 20 s is full. In this way, because timing of the prohibit timer is not stopped when the call for the service of the first service type is initiated, initiation of a call for the service of the second service type can be continuously prevented, at the same time, the initiation of the call for the service of the first service type is allowed, so that the frequency of receiving calls for the service of the second service type when the network side cannot meet the resource demand of the service of the second service type is reduced, and system resources are saved.

Figure 6:
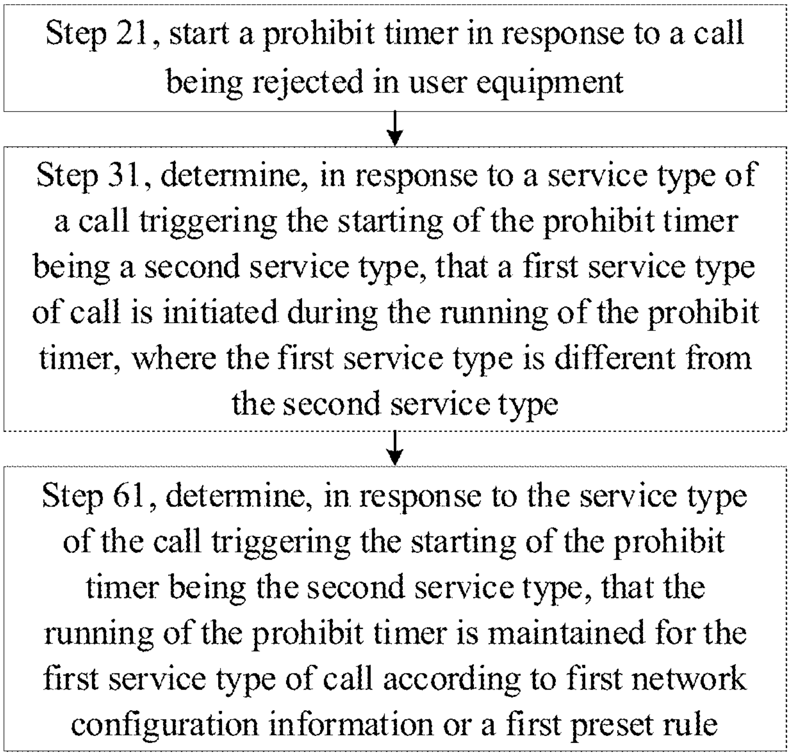
FIG. 6 is a flowchart of an access control method illustrated according to an example.

As shown in FIG. 6, the example provides an access control method including steps 21 and 31 and further expanding step 51, maintaining, in response to the service type of the call triggering the start of the prohibit timer being the second service type, the running of the prohibit timer for the first service type of call.

In step 61, in response to the service type of the call triggering the start of the prohibit timer being the second service type, it is determined that the running of the prohibit timer is maintained for the first service type of call according to a first network configuration information or a first preset rule.

In one example, the first network configuration information may be configuration information transmitted by the network-side device to the user equipment.

In one example, the first preset rule may be a rule determined when network deployment is performed. The user equipment or the network-side device may be set based on the first preset rule. Here, the first preset rule may also be specified through a communication protocol.

In one example, the user equipment may receive the first network configuration information transmitted by a system message or a radio resource control (RRC) connection release message. Here, the first network configuration information may be carried through an existing system message or the radio resource control (RRC) connection release message, and the compatibility of the system message and the radio resource control (RRC) connection release message may be improved.

In one example, the first network configuration information may contain an identifier of the service of the first service type, for instance, an identifier of "001" for a voice service, an identifier of "010" for a video service, and/or an identifier of "011" for a location service. In this way, the user equipment may determine which services are specifically included in the service of the first service type according to the identifier of the service of the first service type.

In one example, the first network configuration information may further contain an identifier of the service of the second service type, for instance, an identifier of "100" for a high-precision image recognition service and an identifier of "101" for a massive data processing service. In this way, the user equipment may determine which services are specifically included in the service of the second service type according to the identifier of the service of the second service type.

In one example, the network-side device or the user equipment may be set in advance according to the first preset rule during network deployment or factory setting of the user equipment.

In one example, determining that the running of the prohibit timer is maintained for the first service type of call according to the first network configuration information may be setting an identifier "1" for the service of the first service type in an information domain of the first network configuration information. In this way, when receiving the first network configuration information, the user equipment may maintain the running prohibit timer for the first service type of call according to the identifier "1".

Figure 7:
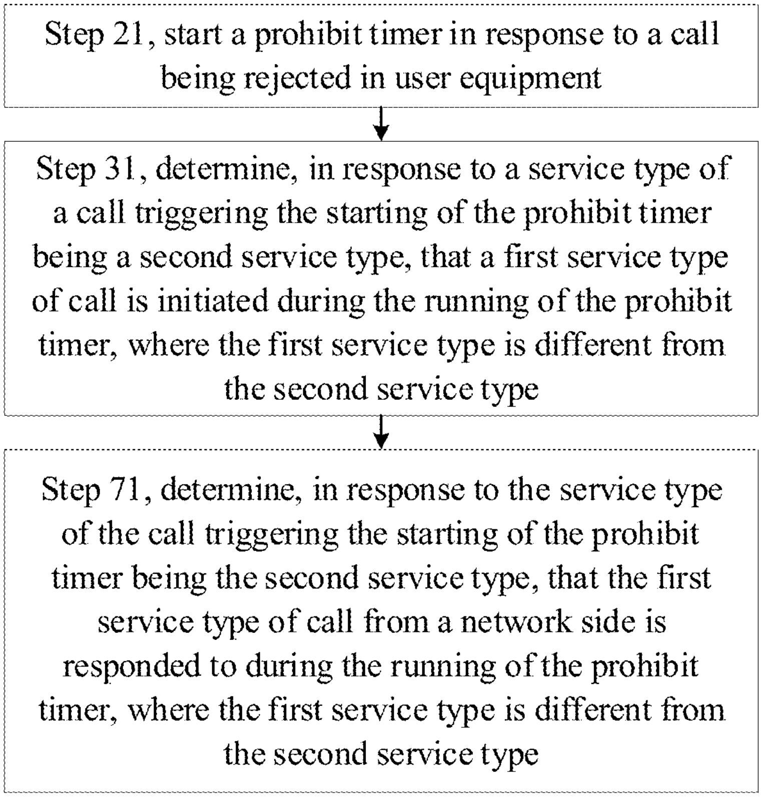
FIG. 7 is a flowchart of an access control method illustrated according to an example.

As shown in FIG. 7, the example provides an access control method, including steps 21, 31, and 71.

In step 71, in response to the service type of the call triggering the start of the prohibit timer being the second service type, it is determined that the first service type of call from the network side is responded to during the running of the prohibit timer, where the first service type is different from the second service type.

For instance, when receiving a radio resource control connection message, the user equipment may transmit a response message for the radio resource control connection message to the network-side device, so as to set up an associated RRC connection.

In one example, the method further includes: in response to the service type of the call triggering the start of the prohibit timer being the second service type, the running of the prohibit timer is maintained for a received radio resource control connection message associated with the first service type.

In one example, the radio resource control connection message includes: a radio resource control connection setup message or a radio resource control connection resume message.

In one example, maintaining the running of the prohibit timer for the received radio resource control connection message associated with the first service type may be that when the radio resource control connection setup message is received, the running of the prohibit timer is not stopped.

In one example, in response to the call initiated for the service of the second service type being rejected by the network side, the user equipment triggers the start of the prohibit timer. Here, a call initiated by the user equipment in response to the high-precision image processing service may be rejected by the network side. Since the high-precision image processing service needs to consume a large amount of computing resources, and the network-side device cannot meet it, the network-side device transmits a radio resource control (RRC) connection reject message carrying a wait time to the user equipment. In response to receiving the radio resource control (RRC) connection reject message, the user equipment triggers the start of the prohibit timer, and sets the wait time as the running duration of the prohibit timer. Here, the running duration is 20 s. If the user equipment receives the radio resource control connection setup message when the prohibit timer is timed to 10 s, at this time, the timing of the prohibit timer will not be stopped, but will continue according to the set running duration of 20 s until the timing of 20 s is full. In this way, because timing of the prohibit timer is not stopped when the radio resource control connection setup message is received, the service of the second service type can be continuously prevented from initiating a call, at the same time, response to the received radio resource control connection setup message is allowed, the frequency of receiving calls initiated by the service of the second service type when the network side cannot meet the resource demand of the service of the second service type is reduced, and system resources are saved.

In one example, the radio resource control connection setup message includes: a radio resource control connection setup message triggered by paging initiated by a radio network, a radio resource control connection setup message triggered by paging initiated by a core network and/or a radio resource control connection resume message triggered by an emergency call.

In one example, the prohibit timer may not be stopped because of receiving the RRC connection setup message triggered by the paging initiated by the radio network.

Further, the prohibit timer may not be stopped because of receiving the RRC connection setup message triggered by the paging initiated by the core network.

Additionally, the prohibit timer may not be stopped because of receiving the RRC connection setup message triggered by the emergency call.

In one example, maintaining the running of the prohibit timer for the received radio resource control connection message associated with the first service type may be that when the radio resource control connection resume message associated with the first service type is received, the running of the prohibit timer is maintained.

In one example, in response to the call initiated by the service of the second service type being rejected by the network side, the user equipment triggers the start of the prohibit timer. Here, a call initiated by the user equipment in response to the high-precision image processing service may be rejected by the network side. Since the high-precision image processing service needs to consume a large amount of computing resources, and the network-side device cannot meet it, the network-side device transmits a radio resource control (RRC) connection reject message carrying a wait time to the user equipment. In response to receiving the radio resource control (RRC) connection reject message, the user equipment triggers the start of the prohibit timer, and sets the wait time as the running duration of the prohibit timer. Here, the running duration is 20 s. If the radio resource control connection resume message is received when the prohibit timer is timed to 10 s, at this time, the timing of the prohibit timer will not be stopped, but will continue according to the set running duration of 20 s until the timing of 20 s is full. In this way, because timing of the prohibit timer is not stopped when the radio resource control connection resume message is received, the service of the second service type can be continuously prevented from initiating a call, at the same time, response to the received radio resource control connection resume message is allowed, the frequency of receiving calls initiated by the service of the second type service when the network side cannot meet the resource demand of the service of the second service type is reduced, and system resources are saved.

In one example, the radio resource control connection resume message includes: a radio resource control connection resume message triggered by the paging initiated by the radio network, a radio resource control connection resume message triggered by the paging initiated by the core network, and/or a radio resource control connection resume message triggered by the emergency call.

In one example, the prohibit timer may not be stopped because of receiving the RRC connection resume message triggered by the paging initiated by the radio network. Further, the prohibit timer may not be stopped because of receiving the RRC connection resume message triggered by the paging initiated by the core network. Additionally, the prohibit timer may not be stopped because of receiving the RRC connection resume message triggered by the emergency call.

Figure 8:
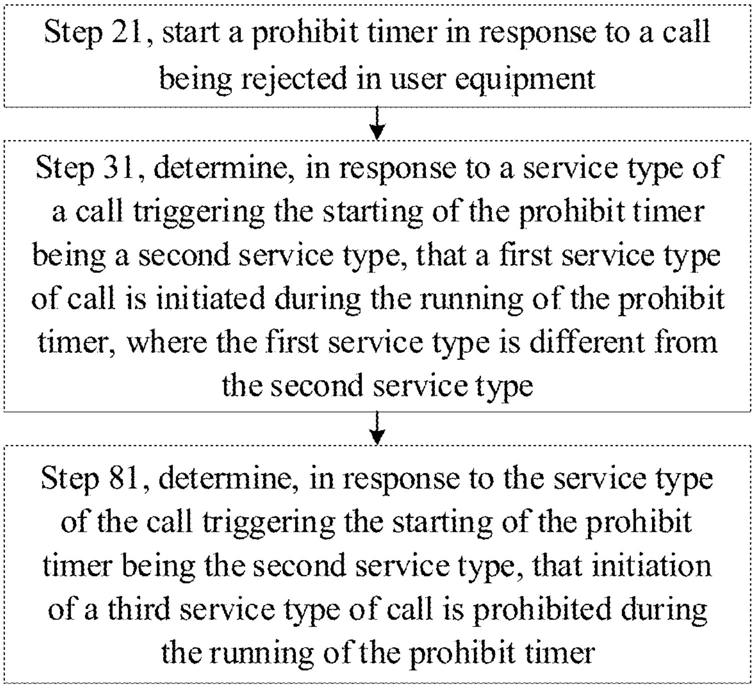
FIG. 8 is a flowchart of an access control method illustrated according to an example.

As shown in FIG. 8, the example provides an access control method, including steps 21, 31, and 81.

In step 81, in response to the service type of the call triggering the start of the prohibit timer being the second service type, it is determined that initiation of a third service type of call is prohibited during the running of the prohibit timer.

In one example, a service of the third service type may be a service the same as the service of the second service type. For instance, they are both services that mainly need computing resources and merely need a small amount of radio resources. In another example, the service of the third service type may be a service different from the service of the second service type. For instance, it is a service that needs a large amount of computing resources and radio resources at the same time.

Here, the service of the third service type may be different from that of the second service type. For instance, the service of the second service type is a model training service that needs to consume a large amount of computing resources, and the service of the third service type is a model reasoning service that also needs to consume a large amount of computing resources. At the same time, in one example, the service of the second service type also needs the user equipment to upload training data samples and the like by using a large amount of radio resources.

In one example, the service of the second service type is a service that needs a large amount of computing resources, for instance, the model training service that needs a large amount of computing resources. A second service type of call may be a call initiated by the model training service.

In one example, the user equipment initiates a call to the network-side device for the model training service. Since the model training service needs to consume a large amount of radio resources, and the network-side device cannot meet it, the network-side device transmits a radio resource control (RRC) connection reject message carrying a wait time to the user equipment. In response to receiving the radio resource control (RRC) connection reject message, the user equipment starts the prohibit timer, and sets the wait time as the running duration of the prohibit timer. When the prohibit timer is running, the user equipment needs to initiate a call for the model reasoning service, since the model reasoning service also needs the large amount of computing resources needed by initiating the model training service, and the network side does not have a large amount of idle computing resources, and at this time, the model reasoning service may be prohibited from initiating a call. In this way, in a case where the computing resources are insufficient, unnecessary calls for the service of the third service type are reduced, and call resources of the system are saved.

Figure 9:
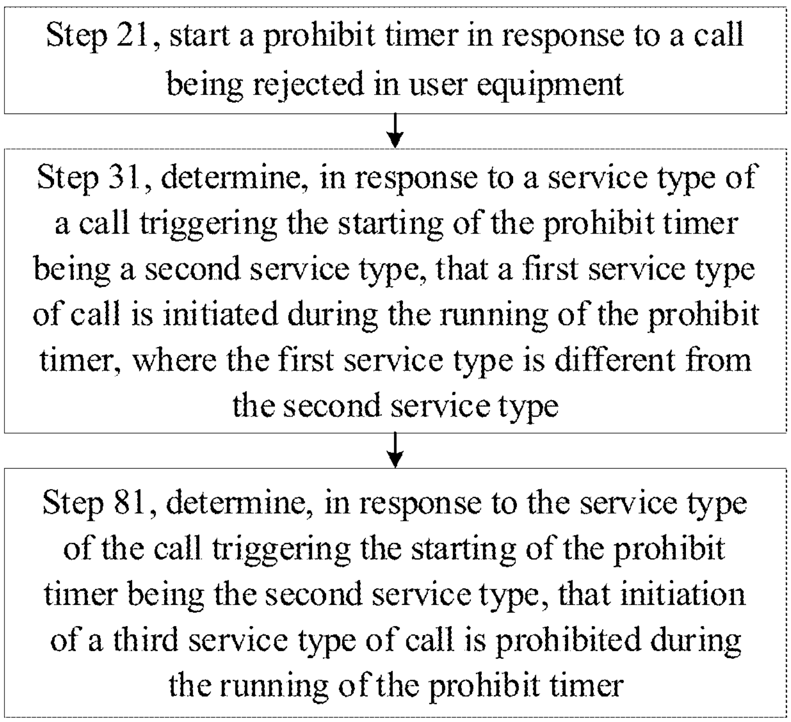
FIG. 9 is a flowchart of an access control method illustrated according to an example.

As shown in FIG. 9, the example provides an access control method which includes step 21 and further expands step 81, determining, in response to the service type of the call triggering the start of the prohibit timer being the second service type, that initiation of the third service type of call is prohibited during the running of the prohibit timer.

Step 91, in response to the service type of the call triggering the start of the prohibit timer being the second service type, transmission of a notification message that prohibits the third service type of call to a non-access stratum (NAS) by an access stratum (AS) of the user equipment is triggered based on the prohibit timer.

In step 92, according to the notification message, the third service type of call is stopped by the non-access stratum (NAS) during the running of the prohibit timer.

In one example, the user equipment initiates a call to the network-side device for a video communication service. Since the video communication service needs to consume a large amount of radio resources, and the network-side device cannot meet it, the network-side device transmits a radio resource control (RRC) connection reject message carrying a wait time to the user equipment. In response to receiving the radio resource control (RRC) connection reject message, the user equipment starts the prohibit timer, and sets the wait time as a running duration of the prohibit timer. When the prohibit timer is started, the access stratum (AS) of the user equipment may transmit the notification message that prohibits the third service type of call to the non-access stratum (NAS). After receiving the notification message, the non-access stratum (NAS) may stop the third service type of call according to the notification message during the running of the prohibit timer, so that the goal of prohibiting the third service type of call is realized.

In one example, determining the operation for the first service type of call during the running of the prohibit timer is based on the second network configuration information or a second preset rule.

In one example, the second network configuration information may be configuration information transmitted by the network-side device to the user equipment.

In one example, the second preset rule may be a rule determined when network deployment is performed. The user equipment or the network-side device may be set based on the second preset rule. Here, the second preset rule may also be specified by a communication protocol.

In one example, the user equipment may receive the second network configuration information transmitted by a system message or a radio resource control (RRC) connection release message. Here, the second network configuration information may be carried through an existing system message or the radio resource control (RRC) connection release message, and the compatibility of the system message and the radio resource control (RRC) connection release message may be improved.

In one example, the second network configuration information may contain an identifier of the service of the first service type, for instance, an identifier of "001" for a voice service, an identifier of "010" for a video service, and/or an identifier of "011" for a location service. In this way, the user equipment may determine which services are specifically included in the service of the first service type according to the identifier of the service of the first service type.

In one example, the second network configuration information may further contain an identifier of the service of the second service type, for instance, an identifier of "100" for a high-precision image recognition service and an identifier of "101" for a massive data processing service. In this way, the user equipment may determine which services are specifically included in the service of the second service type according to the identifier of the service of the second service type.

In one example, the second network configuration information may further contain an identifier of the service of the third service type, for instance, an identifier of "110" for a model reasoning and analysis service. In this way, the user equipment may determine which services are specifically included in the service of the third service type according to the identifier of the service of the third service type.

In one example, the network-side device or the user equipment may be set in advance according to the second preset rule during network deployment or factory setting of the user equipment.

In one example, the second network configuration information allowing the service of the first service type to initiate a call may be that an identifier "1" is set in an information domain of the second network configuration information; and the second network configuration information prohibiting the service of the first service type from initiating the call may be that an identifier "0" is set in the information domain of the second network configuration information. In this way, when receiving the second network configuration information, the user equipment may determine whether to allow the service of the first service type to initiate the call according to the identifier "1" or "0".

Figure 10:
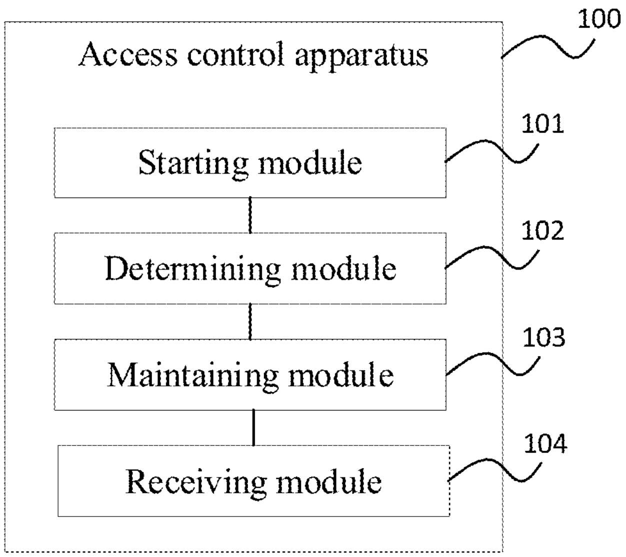
FIG. 10 is a schematic diagram of an access control apparatus illustrated according to an example.

As shown in FIG. 10, the example provides an access control apparatus 100, applied to the user equipment, and including a starting module 101 and a determining module 102.

The starting module 101 is configured to: start a prohibit timer in response to a call being rejected in user equipment; and the determining module 102 is configured to determine, according to a service type of the call triggering the start of the prohibit timer, an operation for a first service type of call during the running of the prohibit timer.

In one example, the determining module 102 is further configured to: determine, in response to the service type of the call triggering the start of the prohibit timer being a second service type, that the first service type of call is initiated during the running of the prohibit timer, where the first service type is different from the second service type.

In one example, the determining module 102 is further configured to: not transmit, in response to the service type of the call triggering the start of the prohibit timer being the second service type, a notification message to a non-access stratum (NAS) by an access stratum (AS) of the user equipment.

In one example, the apparatus further includes a maintaining module 103, and the maintaining module 103 is further configured to: maintain, in response to the service type of the call triggering the start of the prohibit timer being the second service type, the running of the prohibit timer for the first service type of call.

In one example, the maintaining module 103 is further configured to: determine, in response to the service type of the call triggering the start of the prohibit timer being the second service type, that the running of the prohibit timer is maintained for the first service type of call according to first network configuration information or a first preset rule.

In one example, the determining module 102 is further configured to: determine, in response to the service type of the call triggering the start of the prohibit timer being a second service type, that the first service type of call from a network side is responded to during the running of the prohibit timer, where the first service type is different from the second service type.

In one example, the apparatus further includes a maintaining module 103, and the maintaining module 103 is configured to: maintain, in response to the service type of the call triggering the start of the prohibit timer being a second service type, the running of the prohibit timer for a received radio resource control connection message associated with the first service type.

In one example, the determining module 102 is further configured to: determine, in response to the service type of the call triggering the start of the prohibit timer being the second service type, that initiation of a third service type of call is prohibited during the running of the prohibit timer.

In one example, the determining module 102 is further configured to: trigger, in response to the service type of the call triggering the start of the prohibit timer being the second service type, transmission of a notification message that prohibits the third service type of call to a non-access stratum (NAS) by an access stratum (AS) of the user equipment based on the prohibit timer; and stop, by the non-access stratum (NAS), according to the notification message, the third service type of call during the running of the prohibit timer.

In one example, the apparatus further includes a receiving module 104. The receiving module 104 is configured to receive the first network configuration information and/or the second network configuration information transmitted by a system message or a radio resource control (RRC) connection release message.

As for the apparatus in the above examples, the specific manner in which each module performs operations has been described in detail in the examples of the method, so a detailed description of these examples will not be further provided herein.

An example of the disclosure provides a communication device including a processor and a memory configured to store processor-executable instructions. The processor is configured to perform the method described in any example of the disclosure when executing the processor-executable instructions. The processor may include various types of storage media. The storage media are non-transitory computer storage media, and can continue to memorize stored information after a communication device is powered down.

The processor may be connected to the memory via a bus and the like, and configured to read computer-executable programs stored in the memory.

An example of the disclosure further provides a non-transitory computer storage medium storing computer-executable programs, and the computer-executable programs, when executed by a processor, implement the method of any example of the disclosure.

As for the apparatus in the above examples, the specific manner in which each module performs operations has been described in detail in the examples of the method, so a detailed description of these examples will not be further provided herein.

Figure 11:
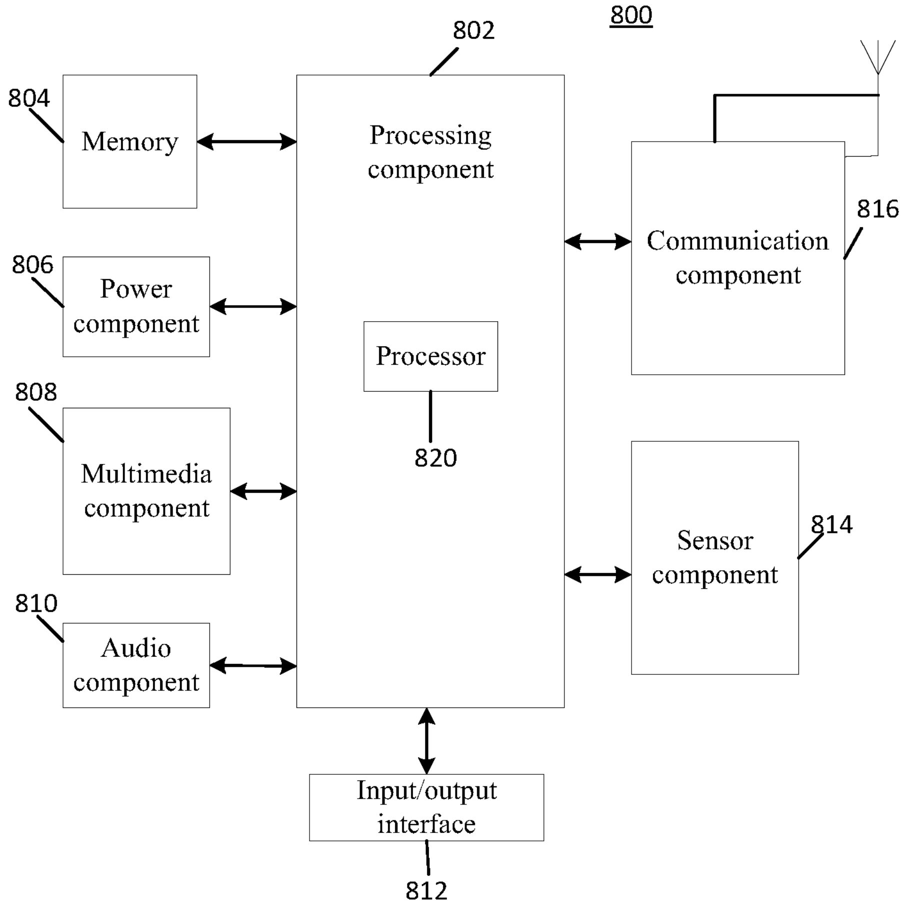
FIG. 11 is a block diagram of a user equipment illustrated according to an example.

FIG. 11 is a block diagram of the user equipment (UE) 800 illustrated according to an example. For instance, the user equipment 800 may be a mobile phone, a computer, digital broadcasting user equipment, a messaging device, a game console, a tablet device, a medical device, a fitness device, or a personal digital assistant.

Referring to FIG. 11, the user equipment 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operation of the user equipment 800, such as operations associated with display, telephone calls, data communication, camera operations, and recording operations. The processing component 802 may include one or more processors 820 to execute instructions to complete all or part of the steps of the above method. In addition, the processing component 802 may include one or more modules to facilitate interaction between the processing component 802 and other components. For instance, the processing component 802 may include a multimedia module to facilitate interaction between the multimedia component 808 and the processing component 802.

The memory 804 is configured to store various types of data to support operations on the user equipment 800. Instances of these data include instructions for any application or method operating on the user equipment 800, contact data, phonebook data, messages, pictures, videos, etc. The memory 804 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disk.

The power component 806 provides power for various components of the user equipment 800. The power component 806 may include a power management system, one or more power sources, and other components associated with generating, managing, and distributing power for the user equipment 800.

The multimedia component 808 includes a screen providing an output interface between the user equipment 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding, and gestures on the touch panel. The touch sensor cannot merely sense the boundary of the touch or sliding operation, but also detect the duration and pressure related to the touch or sliding operation. In some examples, the multimedia component 808 includes a front camera and/or a rear camera. When the user equipment 800 is in an operation mode, such as a shooting mode or a video mode, the front camera and/or the rear camera can receive external multimedia data. Each of the front and rear cameras can be a fixed optical lens system or have a focal length and optical zoom capability.

The audio component 810 is configured to output and/or input audio signals. For instance, the audio component 810 includes a microphone (MIC) configured to receive an external audio signal when the user equipment 800 is in the operation mode, such as a call mode, a recording mode, and a speech recognition mode. The received audio signal may be further stored in the memory 804 or transmitted via the communication component 816. In some examples, the audio component 810 further includes a speaker for outputting an audio signal.

The I/O interface 812 provides an interface between the processing component 802 and a peripheral interface module. The peripheral interface module may be a keyboard, a click wheel, or a button. This button may include, but is not limited to, a home button, a volume button, a start button, or a lock button.

The sensor component 814 includes one or more sensors for providing state evaluation of various aspects of the user equipment 800. For instance, the sensor component 814 can detect an on/off state of the equipment 800 and the relative positioning of the components, for instance, the component is a display and a keypad of the user equipment 800. The sensor component 814 can also detect the change of the position of the user equipment 800 or one component of the user equipment 800, the presence or absence of user contact with the user equipment 800, the azimuth or acceleration/deceleration of the user equipment 800, and a temperature change of the user equipment 800. The sensor component 814 may include a proximity sensor configured to detect the presence of nearby objects without any physical contact. The sensor component 814 may further include an optical sensor, such as a CMOS or a CCD image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate wired or wireless communication between the user equipment 800 and other devices. The user equipment 800 may access a wireless network based on a communication standard, such as Wi-Fi, 2G, 3G, or their combination. In an example, the communication component 816 receives a broadcast signal or broadcast-related information from an external broadcast management system via a broadcast channel. In an example, the communication component 816 further includes a near-field communication (NFC) module to facilitate short-range communication. For instance, the NFC module may be implemented based on a radio frequency identification (RFID) technology, an infrared data association (IrDA) technology, an ultra-wideband (UWB) technology, a Bluetooth (BT) technology, and other technologies.

In an example, the user equipment 800 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for executing the above method.

In an example, a non-transitory computer-readable storage medium including instructions is further provided, such as the memory 804 including instructions, which can be executed by the processor 820 of the user equipment 800 to complete the above method. For instance, the non-transitory computer-readable storage medium may be a ROM, a random access memory (RAM), a CD-ROM, a magnetic tape, a floppy disk, an optical data storage device, etc.

Figure 12:
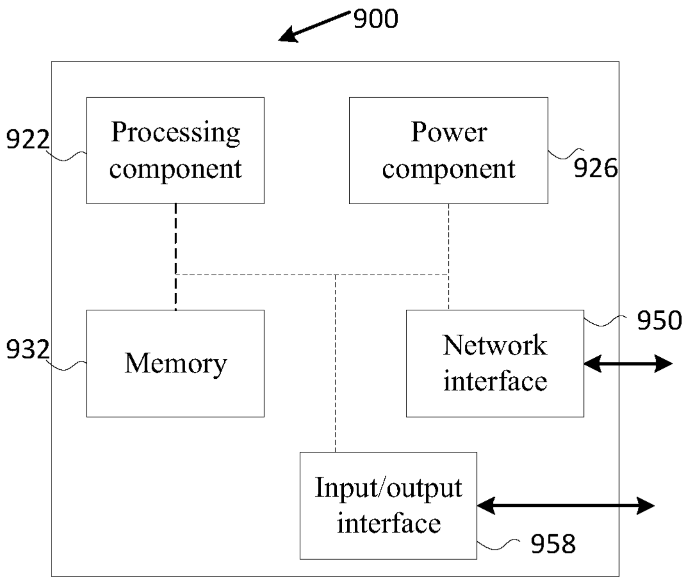
FIG. 12 is a block diagram of a base station illustrated according to an example.

As shown in FIG. 12, an example of the disclosure provides a structure of a base station. For instance, the base station 900 may be provided as a network-side device. Referring to FIG. 12, the base station 900 includes a processing component 922, which further includes one or more processors, and a memory resource represented by a memory 932, which is configured to store instructions, such as applications, executable by the processing component 922. The applications stored in the memory 932 may include one or more modules, each corresponding to a set of instructions. In addition, the processing component 922 is configured to execute instructions to perform any of the methods performed by the base station.

The base station 900 may further include the power component 926 configured to execute power management of the base station 900, a wired or wireless network interface 950 configured to connect the base station 900 to the network, and an input/output (I/O) interface 958. The base station 900 may operate an operating system stored in the memory 932, such as Windows Server™, Mac OS X™, Unix™, Linux™, FreeBSD™, and the like.

According to a first aspect of an example of the disclosure, an access control method is provided and performed by the user equipment, including: starting a prohibit timer in response to a call being rejected in the user equipment; and determining, according to a service type of the call triggering the start of the prohibit timer, an operation for a first service type of call during running of the prohibit timer.

In one example, determining, according to the service type of the call triggering the start of the prohibit timer, the operation for the first service type of call during the running of the prohibit timer, includes: determining, in response to the service type of the call triggering the start of the prohibit timer being a second service type, that the first service type of call is initiated during the running of the prohibit timer, where the first service type is different from the second service type.

In one example, determining, in response to the service type of the call triggering the start of the prohibit timer being the second service type, that the first service type of call is initiated during the running of the prohibit timer, includes: not transmitting, in response to the service type of the call triggering the start of the prohibit timer being the second service type, a notification message to a non-access stratum (NAS) by an access stratum (AS) of the user equipment.

In one example, the method further includes: maintaining, in response to the service type of the call triggering the start of the prohibit timer being the second service type, the running of the prohibit timer for the first service type of call.

In one example, maintaining, in response to the service type of the call triggering the start of the prohibit timer being the second service type, the running of the prohibit timer for the first service type of call, includes: determining, in response to the service type of the call triggering the start of the prohibit timer being the second service type, that the running of the prohibit timer is maintained for the first service type of call according to first network configuration information or a first preset rule.

In one example, determining, according to the service type of the call triggering the start of the prohibit timer, the operation for the first service type of call during the running of the prohibit timer, includes: determining, in response to the service type of the call triggering the start of the prohibit timer being a second service type, that the first service type of call from a network side is responded to during the running of the prohibit timer, where the first service type is different from the second service type.

In one example, the method further includes: maintaining, in response to the service type of the call triggering the start of the prohibit timer being the second service type, the running of the prohibit timer for a received radio resource control connection message associated with the first service type.

In one example, the radio resource control connection message includes: a radio resource control connection setup message or a radio resource control connection resume message.

In one example, the radio resource control connection setup message includes: a radio resource control connection setup message triggered by paging initiated by a radio network, a radio resource control connection setup message triggered by paging initiated by a core network, and/or a radio resource control connection setup message triggered by an emergency call.

In one example, the radio resource control connection resume message includes: a radio resource control connection resume message triggered by the paging initiated by the radio network, a radio resource control connection resume message triggered by the paging initiated by the core network and/or a radio resource control connection resume message triggered by the emergency call.

In one example, the second type of call is an artificial intelligence (AI) service.

In one example, the method further includes determining, in response to the service type of the call triggering the start of the prohibit timer being a second service type, that initiation of a third service type of call is prohibited during the running of the prohibit timer.

In one example, determining, in response to the service type of the call triggering the start of the prohibit timer being the second service type, that the initiation of the third service type of call is prohibited during the running of the prohibit timer, includes: triggering, in response to the service type of the call triggering the start of the prohibit timer being the second service type of call, transmission of a notification message that prohibits the third service type of call to a non-access stratum (NAS) by an access stratum (AS) of the user equipment based on the prohibit timer; and stopping, by the non-access stratum (NAS), according to the notification message, the third service type of call during the running of the prohibit timer.

In one example, determining the operation for the first service type during the running of the prohibit timer is based on second network configuration information or a second preset rule.

In one example, the method further includes: receiving the first network configuration information and/or the second network configuration information transmitted by a system message or a radio resource control (RRC) connection release message.

According to a second aspect of an example of the disclosure, an access control apparatus is provided and applied to the user equipment, and includes a starting module and a determining module; the starting module is configured to: start a prohibit timer in response to a call being rejected in the user equipment; and the determining module is configured to determine, according to a service type of the call triggering the start of the prohibit timer, an operation for a first service type of call during running of the prohibit timer.

In one example, the determining module is further configured to: determine, in response to the service type of the call triggering the start of the prohibit timer being a second service type, that the first service type of call is initiated during the running of the prohibit timer, where the first service type is different from the second service type.

In one example, the determining module is further configured to: not transmit, in response to the service type of the call triggering the start of the prohibit timer being the second service type, a notification message to a non-access stratum (NAS) by an access stratum (AS) of the user equipment.

In one example, the apparatus further includes a maintaining module, and the maintaining module is further configured to: maintain, in response to the service type of the call triggering the start of the prohibit timer being the second service type, the running of the prohibit timer for the first service type of call.

In one example, the maintaining module is further configured to: determine, in response to the service type of the call triggering the start of the prohibit timer being the second service type, that the running of the prohibit timer is maintained for the first service type of call according to a first network configuration information or a first preset rule.

In one example, the determining module is further configured to: determine, in response to the service type of the call triggering the start of the prohibit timer being a second service type, that the first service type of call from a network side is responded to during the running of the prohibit timer, where the first service type is different from the second service type.

In one example, the apparatus further includes a maintaining module, and the maintaining module is configured to: maintain, in response to the service type of the call triggering the start of the prohibit timer being the second service type, the running of the prohibit timer for a received radio resource control connection message associated with the first service type.

In one example, the determining module is further configured to: determine, in response to the service type of the call triggering the start of the prohibit timer being a second service type, that initiation of a third service type of call is prohibited during the running of the prohibit timer.

In one example, the determining module is further configured to trigger, in response to the service type of the call triggering the start of the prohibit timer being the second service type, transmission of a notification message that prohibits the third service type of call to a non-access stratum (NAS) by an access stratum (AS) of the user equipment based on the prohibit timer; and stop, by the non-access stratum (NAS), according to the notification message, the third service type of call during the running of the prohibit timer.

In one example, the determining module is further configured to determine the operation for the first service type of call during the running of the prohibit timer based on second network configuration information or a second preset rule.

In one example, the apparatus further includes a receiving module configured to receive the first network configuration information and/or the second network configuration information transmitted by a system message or a radio resource control (RRC) connection release message.

According to a third aspect of an example of the disclosure, a communication device is provided. The communication device includes a processor and a memory configured to store processor-executable instructions.

The processor is configured to perform the method according to the first aspect when executing the processor-executable instructions.

According to a fourth aspect of the example of the disclosure, a non-transitory computer storage medium is provided. The non-transitory computer storage medium stores computer-executable programs, and the computer-executable programs implement the method according to the first aspect when being executed by a processor.

In the examples of the disclosure, in response to the call being rejected in the user equipment, the prohibit timer is started; and according to the service type of the call triggering the start of the prohibit timer, the operation for the first service type of call during the running of the prohibit timer is determined. Here, during the running of the prohibit timer, the operation for the first service type of call is not necessarily prohibited, but whether the operation for the first service type of call is allowed is determined according to the service type of the call triggering the start of the prohibit timer. Compared with the mode that the operation for the first service type of call will be necessarily prohibited during the running of the prohibit timer, there is still an opportunity to initiate the first service type of call or respond to the first service type of call, so as to obtain network resources of services. In this way, on the one hand, the operation for the first service type of call is more flexible; and on the other hand, the utilization rate of the network resources is improved.

Other examples of the disclosure will be apparent to those skilled in the art from consideration of the specification and practice of the disclosure here. The disclosure is intended to cover any variations, uses, or adaptations of the disclosure following the general principles of the disclosure and including such departures from the disclosure as come within known or customary practice in the art. It is intended that the specification and examples are considered as examples merely, with a true scope and spirit of the disclosure being indicated by the following claims.

It will be appreciated that the disclosure is not limited to the exact construction that has been described above and illustrated in the accompanying drawings, and that various modifications and changes may be made without departing from its scope. It is intended that the scope of the disclosure is merely limited by the appended claims.

What is claimed is:

1. An access control method, performed by a user equipment, and the method comprises:

starting a prohibit timer in response to a call being rejected in the user equipment; and determining, according to a service type of the call triggering the start of the prohibit timer, an operation for a first service type of call during running of the prohibit timer, wherein determining, according to the service type of the call triggering the start of the prohibit timer, the operation for the first service type of call during the running of the prohibit timer comprises:

determining, in a case where the service type of the call triggering the start of the prohibit timer is a second service type, that the first service type of call is initiated during the running of the prohibit timer, and that a call for an artificial intelligence (AI) training-type service is not initiated during the running of the prohibit timer, and wherein a service of the first service type comprises a radio interface resource, the second service type comprises the AI training-type service, and the prohibit timer is started in a case where a computing resource of a network-side device is insufficient to support the AI training-type service.

2. The access control method according to claim 1, wherein determining, in a case where the service type of the call triggering the start of the prohibit timer is the second service type, that the first service type of call is initiated during the running of the prohibit timer, comprises:

not transmitting, in a case where the service type of the call triggering the start of the prohibit timer is the second service type, a notification message to a non-access stratum (NAS) by an access stratum (AS) of the user equipment.

3. The access control method according to claim 1, further comprising:

maintaining, in a case where the service type of the call triggering the start of the prohibit timer is the second service type, the running of the prohibit timer for the first service type of call.

4. The access control method according to claim 3, wherein maintaining, in a case where the service type of the call triggering the start of the prohibit timer is the second service type, the running of the prohibit timer for the first service type of call comprises:

determining, in a case where the service type of the call triggering the start of the prohibit timer is the second service type, that the running of the prohibit timer is maintained for the first service type of call according to a first network configuration information or a first preset rule.

5. The access control method according to claim 1, wherein determining, according to the service type of the call triggering the start of the prohibit timer, the operation for the first service type of call during the running of the prohibit timer, comprises:

determining, in a case where the service type of the call triggering the start of the prohibit timer is the second service type, that the first service type of call from a network side is responded to during the running of the prohibit timer, wherein the first service type is different from the second service type.

6. The access control method according to claim 5, further comprising:

maintaining, in a case where the service type of the call triggering the start of the prohibit timer is the second service type, the running of the prohibit timer for a received radio resource control connection message associated with the first service type.

7. The access control method according to claim 6, wherein the radio resource control connection message comprises:

a radio resource control connection setup message; or a radio resource control connection resume message.

8. The access control method according to claim 7, wherein the radio resource control connection setup message comprises at least one of:

a radio resource control connection setup message triggered by paging initiated by a radio network;

a radio resource control connection setup message triggered by paging initiated by a core network; or a radio resource control connection setup message triggered by an emergency call.

9. The access control method according to claim 8, wherein the radio resource control connection resume message comprises at least one of:

a radio resource control connection resume message triggered by the paging initiated by the radio network;

a radio resource control connection resume message triggered by the paging initiated by the core network; or a radio resource control connection resume message triggered by the emergency call.

10. The access control method according to claim 1, further comprising:

determining, in a case where the service type of the call triggering the start of the prohibit timer is the second service type, that initiation of a third service type of call is prohibited during the running of the prohibit timer.

11. The access control method according to claim 10, wherein determining, in a case where the service type of the call triggering the start of the prohibit timer is the second service type, that initiation of the third service type of call is prohibited during the running of the prohibit timer comprises:

triggering, in a case where the service type of the call triggering the start of the prohibit timer is the second service type, a transmission of a notification message that prohibits the third service type of call to a non-access stratum (NAS) by an access stratum (AS) of the user equipment based on the prohibit timer; and stopping, by the NAS, according to the notification message, the third service type of call during the running of the prohibit timer.

12. The access control method according to claim 1, wherein determining the operation for the first service type of call during the running of the prohibit timer is based on second network configuration information.

13. The access control method according to claim 4, further comprising:

receiving the first network configuration information transmitted by a system message or a radio resource control (RRC) connection release message.

14. A communication device, comprising:

an antenna;

a memory; and a processor respectively connected to the antenna and the memory, wherein the processor is configured to control transceiving of the antenna by executing computer-executable instructions stored in the memory, and the processor is configured to:

start a prohibit timer in response to a call being rejected in a user equipment; and determine, according to a service type of the call triggering the start of the prohibit timer, an operation for a first service type of call during running of the prohibit timer, wherein the processor is further configured to determine, in a case where the service type of the call triggering the start of the prohibit timer is a second service type, that the first service type of call is initiated during the running of the prohibit timer, and that a call for an artificial intelligence (AI) training-type service is not initiated during the running of the prohibit timer, and wherein a service of the first service type comprises a radio interface resource, the second service type comprises the AI training-type service, and the prohibit timer is started in a case where a computing resource of a network-side device is insufficient to support the AI training-type service.

15. A non-transitory computer-executable storage medium storing computer-executable instructions, wherein a processor is configured to execute the computer-executable instructions to:

start a prohibit timer in response to a call being rejected in a user equipment; and determine, according to a service type of the call triggering the start of the prohibit timer, an operation for a first service type of call during running of the prohibit timer, wherein the processor is further configured to execute the computer-executable instructions to determine, in a case where the service type of the call triggering the start of the prohibit timer is a second service type, that the first service type of call is initiated during the running of the prohibit timer, and that a call for an artificial intelligence (AI) training-type service is not initiated during the running of the prohibit timer, and wherein a service of the first service type comprises a radio interface resource, the second service type comprises the AI training-type service, and the prohibit timer is started in a case where a computing resource of a network-side device is insufficient to support the AI training-type service.

16. The access control method according to claim 1, wherein determining the operation for the first service type of call during the running of the prohibit timer is based on a second preset rule.

17. The access control method according to claim 4, further comprises:

receiving second network configuration information transmitted by a system message or a radio resource control (RRC) connection release message.

* * * * *